(12) United States Patent
Agostino et al.

(10) Patent No.: US 12,071,240 B2
(45) Date of Patent: Aug. 27, 2024

(54) DUAL ISR-PAYLOAD CAPABLE UAV

(71) Applicant: Sierra Nevada Corporation, Sparks, NV (US)

(72) Inventors: Emily Agostino, Walnut Creek, CA (US); Curtis Leo, Los Gatos, CA (US); Stephen Morris, Suunyvale, CA (US)

(73) Assignee: Sierra Nevada Company, LLC, Sparks, NV (US)

( * ) Notice: Subject to any disclaimer, the term of this patent is extended or adjusted under 35 U.S.C. 154(b) by 168 days.

(21) Appl. No.: 17/246,133

(22) Filed: Apr. 30, 2021

(65) Prior Publication Data

US 2021/0339859 A1 Nov. 4, 2021

Related U.S. Application Data

(60) Provisional application No. 63/018,390, filed on Apr. 30, 2020.

(51) Int. Cl.
*B64D 1/22* (2006.01)
*B64D 1/10* (2006.01)
(Continued)

(52) U.S. Cl.
CPC ............... *B64D 1/22* (2013.01); *B64D 1/10* (2013.01); *B64D 37/005* (2013.01); *B64D 47/08* (2013.01); *B64U 10/20* (2023.01); *B64U 20/40* (2023.01); *B64U 20/87* (2023.01); *B64C 2211/00* (2013.01); *B64U 2101/30* (2023.01); *B64U 2101/60* (2023.01)

(58) Field of Classification Search
CPC ..... B64C 22/11; B64C 2211/00; B64U 20/40; B64U 20/87; B64U 2101/60; B64U 2101/30; B64D 1/10; B64D 1/22; B64D 37/005; B64D 47/08
See application file for complete search history.

(56) References Cited

U.S. PATENT DOCUMENTS 9,580,173 B1 2/2017 Burgess et al.
10,435,143 B1 * 10/2019 O'Brien ................. B64D 47/08
(Continued)

OTHER PUBLICATIONS

International Search Report in PCT International Application No. PCT/US2021/030244, mailed Jul. 28, 2021.

*Primary Examiner* — Brady W Frazier
*Assistant Examiner* — Shanna Danielle Glover
(74) *Attorney, Agent, or Firm* — Mintz Levin Cohn Ferris Glovsky and Popeo, P.C.

(57) ABSTRACT

A dual use UAV or "drone" can include a battery and primary processor located at a fuselage, as well as two separate modular units removably coupled to the fuselage and in communication with the primary processor. The two separate modular units can interact with each other to provide an enhanced operation while the drone is in flight. One modular unit can be an ISR unit having a video camera, and the other modular unit can be a cargo unit. The enhanced operation can involve the ISR unit using its video camera to identify a delivery location for a cargo pod of the cargo unit. Alternative modular units can include a secondary ISR unit, a cargo fuel pod unit, or a robotic arm assembly. Standardized interfaces coupled to the fuselage can enable the ready removal of one modular unit and installation of another one.

5 Claims, 9 Drawing Sheets

(51) Int. Cl.
  *B64D 37/00* (2006.01)
  *B64D 47/08* (2006.01)
  *B64U 10/20* (2023.01)
  *B64U 20/40* (2023.01)
  *B64U 20/87* (2023.01)
  *B64U 101/30* (2023.01)
  *B64U 101/60* (2023.01)

(56) References Cited

U.S. PATENT DOCUMENTS

| | | |
|---|---|---|
| 10,583,922 B1 | 3/2020 | Boyes et al. |
| 2016/0229536 A1* | 8/2016 | Aull ................. B64D 13/00 |
| 2018/0002015 A1 | 1/2018 | McCullough et al. |
| 2019/0100313 A1 | 4/2019 | Campbell |
| 2019/0161190 A1 | 5/2019 | Gil et al. |
| 2019/0321971 A1 | 10/2019 | Bosworth et al. |
| 2019/0373173 A1 | 12/2019 | Wang et al. |
| 2020/0317324 A1* | 10/2020 | Youmans ................. B64D 1/10 |
| 2020/0354084 A1* | 11/2020 | Priest ................. G06Q 10/0832 |

* cited by examiner

DUAL ISR-PAYLOAD CAPABLE UAV

CROSS-REFERENCE TO RELATED APPLICATIONS

This application claims the benefit of U.S. Provisional Application No. 63/018,390, filed Apr. 30, 2020, which is hereby incorporated by reference in its entirety.

TECHNICAL FIELD

The present disclosure relates generally to drone aircraft, and more particularly to unmanned aerial vehicles ("UAVs") having surveillance systems.

BACKGROUND

UAVs, also known as drones, can be useful in a variety of utility functions. In particular, vertical take off and landing ("VTOL") drone aircraft can be especially useful in delivering a payload or other cargo due to the ability of these drones to land vertically for delivery in a relatively small space. As another example, drone aircraft of various types are sometimes used for intelligence, surveillance, and reconnaissance ("ISR") type missions. Other functions for drone aircraft can include weather forecasting, traffic monitoring, advertising, and military combat use, among many other examples.

Unfortunately, there can be some drawbacks with the use of drone aircraft capable of performing these or other types of functions. Different major functions may require different types of aircraft, with larger or heavier deliveries requiring larger drones, ISR missions requiring a wide array of monitors and sensors, and other types of uses requiring drones that are configured or adapted in a variety of specialized ways. Where an entity, such as a military unit, requires multiple drone functions, this can typically result in a need for multiple drones. The myriad inefficiencies and extra costs with having many different drones to perform different functions and types of missions are readily apparent.

Although traditional ways of delivering cargo, conducting ISR missions, and performing other functions with drone aircraft have worked well in the past, improvements are always helpful. In particular, what is desired are improved drone aircraft that are more flexible in the different types of functions that can be performed by a single drone simultaneously, especially with respect to missions that involve both cargo delivery and ISR functionalities.

SUMMARY

It is an advantage of the present disclosure to provide improved drone aircraft. The disclosed features, apparatuses, systems, and methods provide dual use drone solutions that involve greater flexibility over existing drones. These advantages can be accomplished in multiple ways, such as by having modular units that provide specific drone functions, which modular units can be interactive during drone flight to result in enhanced operations. In a specific example, the dual use drone modular units can include an ISR unit and a cargo unit.

In various embodiments of the present disclosure, a dual use drone can include a fuselage, an electrical power source (e.g., a battery) and a primary processor powered by the electrical power source located at the fuselage, a video camera removably coupled to the fuselage, and a cargo pod removably coupled to the fuselage. The video camera can be part of a modular ISR unit that is in communication with the primary processor, and the cargo pod can be part of a modular cargo unit that is in communication with the primary processor. The modular ISR unit can interact with the modular cargo unit while the dual use drone is in flight. In one embodiment, the modular cargo unit may include a cargo pod, and the cargo pod may be deployed separately from the modular cargo unit. In another embodiment, the modular cargo unit itself with a storage area, may be released from an interface with the fuselage of the drone.

In various detailed embodiments, the primary processor can coordinate the interaction between the modular ISR unit and the modular cargo unit. Alternatively, another processor or controller can coordinate this interaction. The modular ISR unit can utilize its video camera to identify a delivery location for delivery of the cargo pod of the modular cargo unit, which delivery location may be unspecified prior to its identification by the modular ISR unit. The primary processor can direct the flight of the dual use drone to arrive at the delivery location. The modular cargo unit can release its cargo pod when the dual use drone is at the delivery location. In some arrangements, the modular ISR unit can identify the delivery location automatically without any human input.

In various further embodiments of the present disclosure, a modular drone can include a fuselage, a primary processor located at the fuselage, a first modular unit removably coupled to the fuselage, and a second modular unit removably coupled to the fuselage. Both the first modular unit and second modular unit can be electronically controlled and in communication with the primary processor. Also, the first modular unit can interact with the second modular unit to provide an enhanced operation while the modular drone is in flight.

In some detailed embodiments, the first modular unit can be a primary ISR unit having at least a first camera. In such arrangements, the enhanced operation can include the second modular unit interacting with the primary ISR unit to obtain precise location information for a function of the second modular unit. The second modular unit can be a cargo unit, a cargo fuel pod unit, a secondary ISR unit, or a robotic arm assembly. A fuel interface can allow the modular drone to draw fuel from a cargo fuel pod unit, and the modular drone can be configured to use some of the fuel from the cargo fuel pod unit before possibly delivering the cargo fuel pod unit with a remaining amount of fuel therein. A secondary ISR unit can have a second camera, a radar assembly, a lidar assembly, an optical sensor, and/or a communications assembly. A robotic arm assembly can be configured to retrieve a foreign object in the field for transport by the modular drone. The modular drone can also include a first standardized interface coupled to the fuselage and the first modular unit, and also a second standardized interface coupled to the fuselage and the second modular unit. The first standardized interface can be configured to release the first modular unit and accept coupling of a third modular unit, while the second standardized interface can be configured to release the second modular unit and accept coupling of a fourth modular unit. The second and fourth modular units can be different types of units that perform substantially different functions.

In still further embodiments of the present disclosure, various methods of operating a dual use drone can include coupling a first modular unit to a fuselage of the dual use drone, coupling a second modular unit to the fuselage, configuring a primary processor of the dual use drone, and confirming that the first modular unit is configured to interact with the second modular unit to provide an enhanced operation while the modular drone is in flight. The first modular unit can be electronically controlled and configured to perform a first substantial function while the dual use drone is in flight, and the second modular unit can be electronically controlled and configured to perform a second substantial function while the dual use drone is in flight Configuring the primary processor can be for operability with the first modular unit and the second modular unit. Further method steps can include performing the first substantial function by the first modular unit while the dual use drone is in flight and performing the second substantial function by the second modular unit while the dual use drone is in flight. Performing the second substantial function can be interactive with performing the first substantial function to provide the enhanced operation.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for dual use drones having multiple functional capabilities, such as ISR and cargo functions. These drawings in no way limit any changes in form and detail that may be made to the disclosure by one skilled in the art without departing from the spirit and scope of the disclosure.

DETAILED DESCRIPTION

Figure 1:
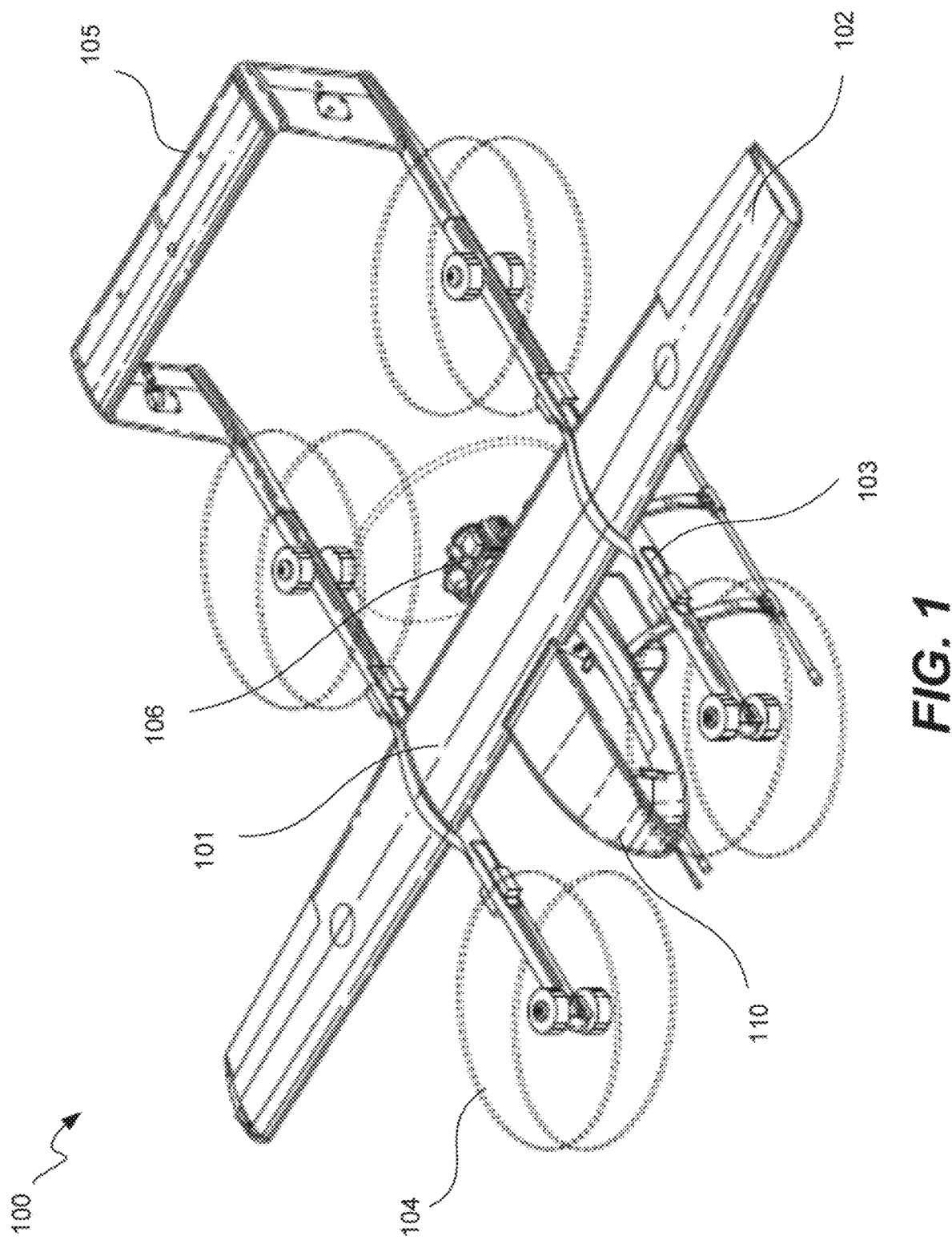
FIG. 1 illustrates in front perspective view an example dual use drone having ISR and cargo delivery capabilities according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for dual use drones having multiple substantial functionalities, such as both ISR and secondary function capabilities. The disclosed embodiments can be modular in nature, such that a single drone can be configured to have multiple different types of use modules. A drone fuselage can include at least two standardized interfaces that allow the ready coupling and removal of disparate modular units that are electronically controlled and have substantial drone functions. In particular, the disparate modular units can operate independently from each other, but can also interact while the dual use drone is in flight to provide an enhanced operation.

In various detailed examples, which are merely illustrative and non-limiting in nature, the disclosed dual use drones can involve coupling an ISR unit and a cargo unit to the drone fuselage, giving the drone simultaneous ISR and cargo delivery abilities. The drone can thus conduct cargo delivery missions while simultaneously providing video recording or other forms of surveillance. The ISR and cargo systems (or alternative secondary systems) combined can provide a 360-degree field of view for precision cargo delivery or other secondary system function. The secondary (e.g., cargo pod) unit coupling can involve a unique interface allowing both high speed data and fuel to be connected. This interface can be a modular design that is able to support alternative secondary units, such as a cargo fuel tank, a communications antenna array, a secondary ISR module, a winch, or a robotic arm assembly, among other possible units.

Although various embodiments disclosed herein discuss a VTOL configured dual use drone that includes a modular primary ISR unit and a modular secondary unit, it will be readily appreciated that the disclosed features, apparatuses, systems, and methods can similarly be used for any relevant drone aircraft of different configurations. For example, a drone aircraft that is not VTOL configured may also use the disclosed components and systems. Dual uses that involve modular units other than ISR and cargo units may also be applied. More than two modular units may also be used, such that the drone is multi use rather than just "dual use."

and these two or more modular units may couple to the drone at locations other than the fuselage. Other applications, arrangements, and extrapolations beyond the illustrated embodiments are also contemplated.

Overall Drone

Referring first to FIG. 1, an example dual use drone having ISR and cargo delivery capabilities is illustrated in front perspective view. Drone 100 can be a modular VTOL configured drone that includes a center wing 101, two outer wings 102, two booms 103 having multiple propellers 104, an empennage assembly 105, an engine 106, and a fuselage 110, among other possible components. Each of these items can be a self-contained module that is readily removable and interchangeable with other similar modules. While the embodiment shown here for purposes of illustration includes four propellers 104 on each boom 103 for a total of eight propellers, it will be readily appreciated that alternative numbers of propellers could be used. For example, a similar drone configuration might utilize only four propellers to form a quadcopter.

Figure 2:
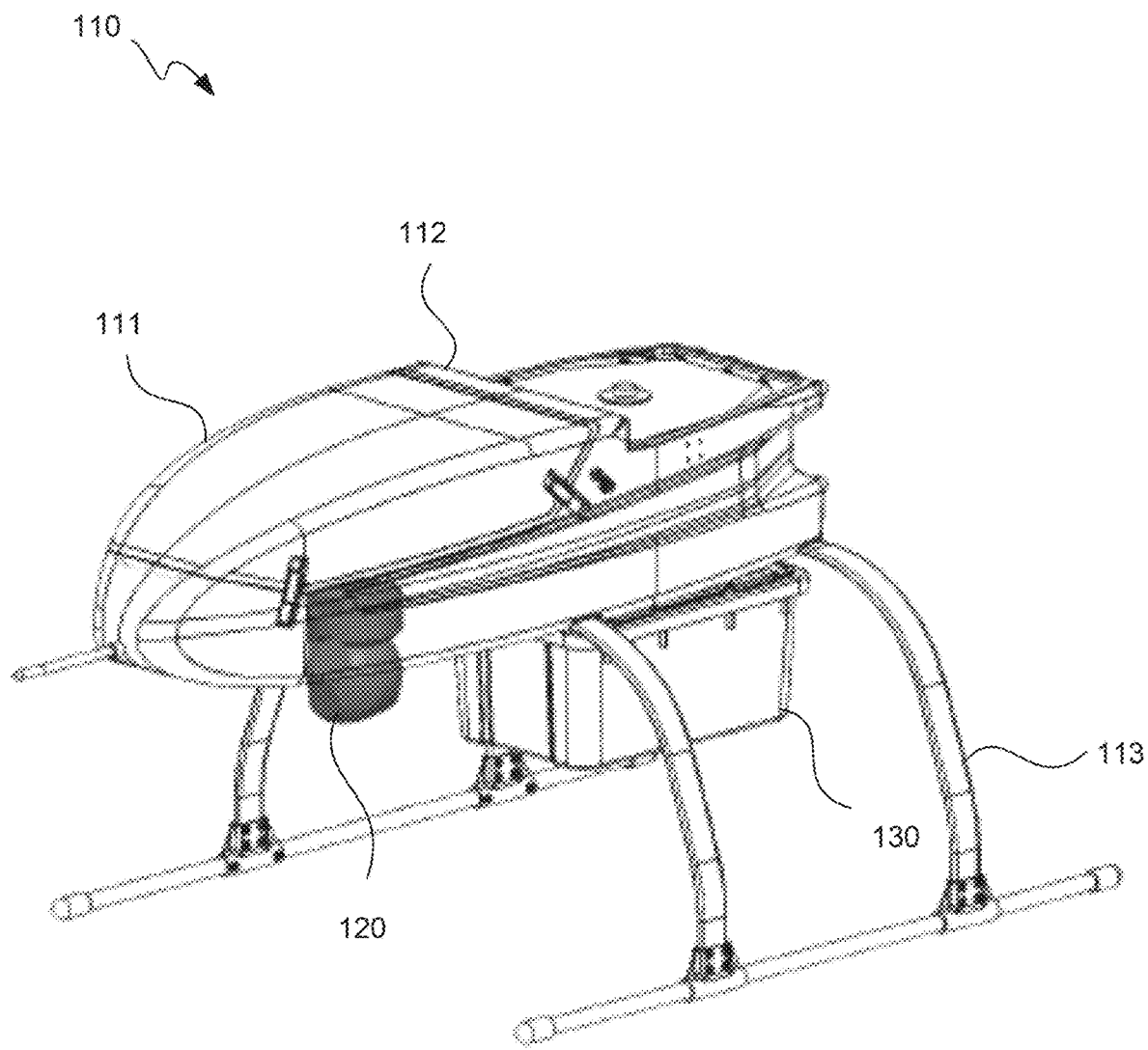
FIG. 2 illustrates in side perspective view an example fuselage for a dual use drone with an ISR module and cargo pod module attached according to one embodiment of the present disclosure.

Continuing with FIG. 2, an example fuselage for a dual use drone with an ISR module and cargo pod module attached is shown in side perspective view. Fuselage 110, which again can be a self-contained module that is interchangeable with different sets of wings, booms, engines, and empennage assemblies, can include a body 111, a fuselage module to center wing module interface 112, and landing gear 113, among other possible features. Fuselage 110 can also include multiple modular units coupled to the modular fuselage itself. In the illustrative non-limiting example shown in FIG. 2, these can be a video camera 120 and a cargo pod 130. Video camera 120 can be part of an overall modular ISR unit, while cargo pod 130 can be part of an overall modular cargo unit. Different sizes of cargo pods 130 can be used depending upon the payload or cargo being transported. While fuselage 110 is shown as having a modular ISR unit and modular cargo unit, different types of units may alternatively be included.

Primary ISR and Secondary Units

In one contemplated embodiment, the dual use drone disclosed herein can have a primary ISR unit as its first modular unit and an interchangeable secondary unit as its second modular unit. The primary ISR unit can include a camera system that is designed to provide a 360-degree view around the drone. This camera system can be interfaced with an on-board computer (e.g., primary processor) to provide visual input. The camera system can provide full motion video and transmit encrypted data signals to ground operators. Other components, such as for example, radar, lidar, visual sensors, and a communications relay may also be included with the primary ISR unit, as will be readily appreciated.

In some arrangements the secondary modular unit can be a cargo system. Such a cargo system can be designed as a multi-functional system where different cargo solutions can be attached to the drone. Each of the cargo pods or overall cargo module units can be remotely deployed, either on the ground or in-flight. An on ground delivery can involve the drone landing at a target identified by a camera of the primary ISR unit and then a release of the cargo pod once the camera confirms that the landing gear of the drone are firmly in place on the target. An in-flight delivery can involve a release of the cargo pod once the camera has confirmed an appropriate location for release. A parachute attached to the cargo pod can be deployed after the cargo pod has been released. Timing for a remote deployment of the parachute can involve the camera capturing the cargo pod as it is released and maintaining vision of the cargo pod until a proper time and/or location of the cargo pod has been achieved. The camera can continue to follow the cargo pod until it lands to confirm its descent and landing and to provide imagery of the cargo pod as delivered. A cargo pod can include an outer shell into which a multitude of items can be placed. A standardized interface between the fuselage and the cargo unit can include a data network and a power interface where the temperature can be monitored and controlled within the cargo pod.

A dual use interface system can enable the first and second modular units to interact with each other to enhance the functionality of both systems. For example, an on-board computer can use a primary ISR unit to identify and track objects of interest, as well as to provide information that is used by the secondary unit. The dual use interface system can use machine learning algorithms to manage and predict landing environments if the secondary unit is a cargo system. The on-board computer can then direct a release of the cargo pod at a location that is determined by the ISR unit. ISR functionality can enhance the ability to target release the cargo pod on a specific moving target in which either a pre-defined target has been uploaded or a set of parameters that matches intended target. For example, the ISR unit can find a life raft in the middle of the ocean and identify this as a delivery target. This information can then be used to direct the drone to the exact location of the life raft and release the payload (i.e., cargo pod) at the identified location.

The ISR unit can also be used to visually confirm target delivery and to relay target information and imaging data to an internal database. The ISR unit can automatically determine if a delivery target or landing zone is clear of obstructions and can also sense and avoid items dynamically as situations change in real time. The dual use interface system can allow for functionalities of tracking multiple moving targets while simultaneously having the aircraft flying in different directions and also alternating or adjusting a delivery target or zone. In some arrangements the ISR camera can behave differently depending upon the secondary modular unit. For example, when the secondary modular unit includes a large cargo pod, the ISR camera can tilt downward when rotated in the direction of the cargo pod when it might otherwise obtain a field of view directly beyond the cargo pod. For such possible situations, the ISR modular unit can be configured to identify a cargo pod type (or other secondary modular unit type) and automatically configure, adjust, and recalibrate the applicable field of view for the ISR camera based on the physical dimensions of the cargo pod or other secondary modular unit. Such reconfiguration and recalibration of the camera field of view can result in full imagery that is unobstructed by the cargo pod or other secondary modular unit. Other interactive functions can exist between an ISR unit and a cargo unit, as well as for other possible secondary units.

Figure 3A:
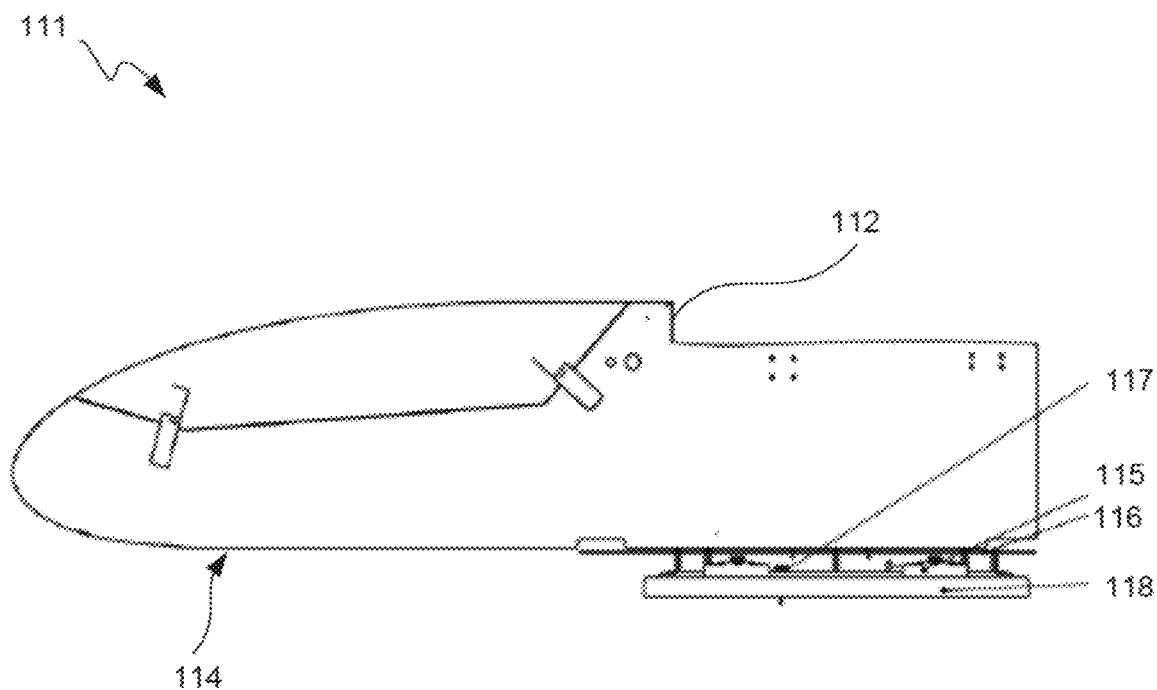
FIG. 3A illustrates in side elevation view an example fuselage body for a dual use drone with no modules attached according to one embodiment of the present disclosure.
Figure 3B:
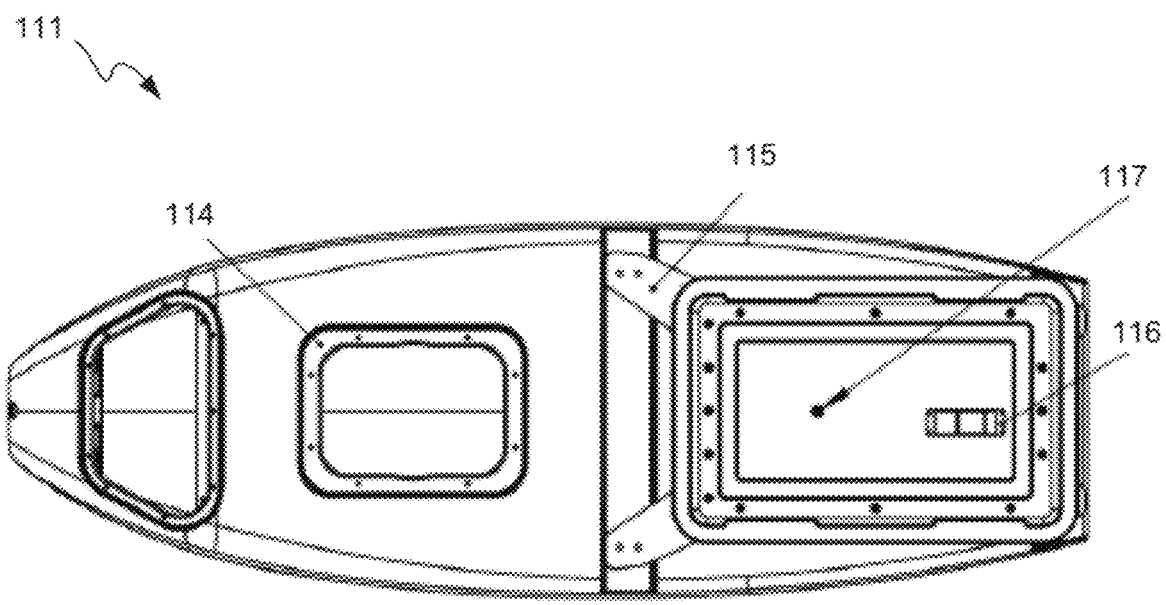
FIG. 3B illustrates in bottom plan view the fuselage body of FIG. 3A according to one embodiment of the present disclosure.

FIGS. 3A and 3B depict an example fuselage body for a dual use drone with no modules attached in a side elevation and bottom plan views respectively. Fuselage body 111 can include a fuselage module to center wing module interface 112, a first standardized interface 114 for a first removably attached modular unit, and a second standardized interface 115 for a second removably attached modular unit. The second standardized interface 115 can include a power interface 116 and a data interface 117 that can couple to various different types of removable modular units. The first standardized interface 114 can also include its own power interface and data interface for a first removably attached modular unit. Both sets of power and data interfaces can involve the use of blind mate electrical connectors as well as floating connectors to facilitate the ready coupling and decoupling of different modular units. In one embodiment, the fuselage having a forward positioned interface on a bottom area of the fuselage, and a rearward positioned interface on the bottom area of the fuselage. The first and second interface 114, 115 may have a frame integrally formed with the body of the fuselage. The frame may have one or more electric connectors to receive from and transmit data a modular unit that is connected to the frame. In one embodiment, the frame of the first interface is a smaller size than the second interface, thus allowing smaller form factor module units to be removeably connected to the first frame, and larger form factor modular units to be removeably connected to the second frame. Connecting larger (e.g., heavier) modular units to the second interface, also provides UAV flight stability with the larger form factor modular unit positioned closer to the UAV's center of gravity.

First standardized interface 114 can also include a detachable mounting plate to facilitate the mechanical coupling of various disparate modular units, which can include a primary ISR unit as well as other types of units. As shown, second standardized interface 115 can include a modular cargo interface 118, which can facilitate the mechanical coupling of a cargo unit in particular. This modular cargo interface 118 may remain with the fuselage body 111 or can be removed together with a modular cargo unit when the modular cargo unit is removed. In some arrangements, other types of removably attached modular units may also be able to attach to modular cargo interface 118. Alternatively, other types of removably attached modular units may have different types of adapter interfaces or may attach directly to the second standardized interface 115.

In the foregoing illustrative example, a dual use drone has been described as having an ISR unit and a cargo unit. It is specifically contemplated, however, that multiple different types of modular units can be used for the disclosed dual use drones. In various embodiments, the first type of unit can be a primary ISR unit such as that which is provided above, while the second type of unit can be a cargo unit, a secondary ISR unit, a cargo fuel pod unit, a robotic arm unit, an expanded data, communication, and power feed unit, or any other suitable secondary unit. These dual use units can be modular, such that the same drone can be used with different dual use units as may be desired. Accordingly, both of these dual use units can be mixed and matched as desired for the specific needs of a given drone mission. Some configurations may not even utilize an ISR unit depending upon particular circumstances.

Figure 4:
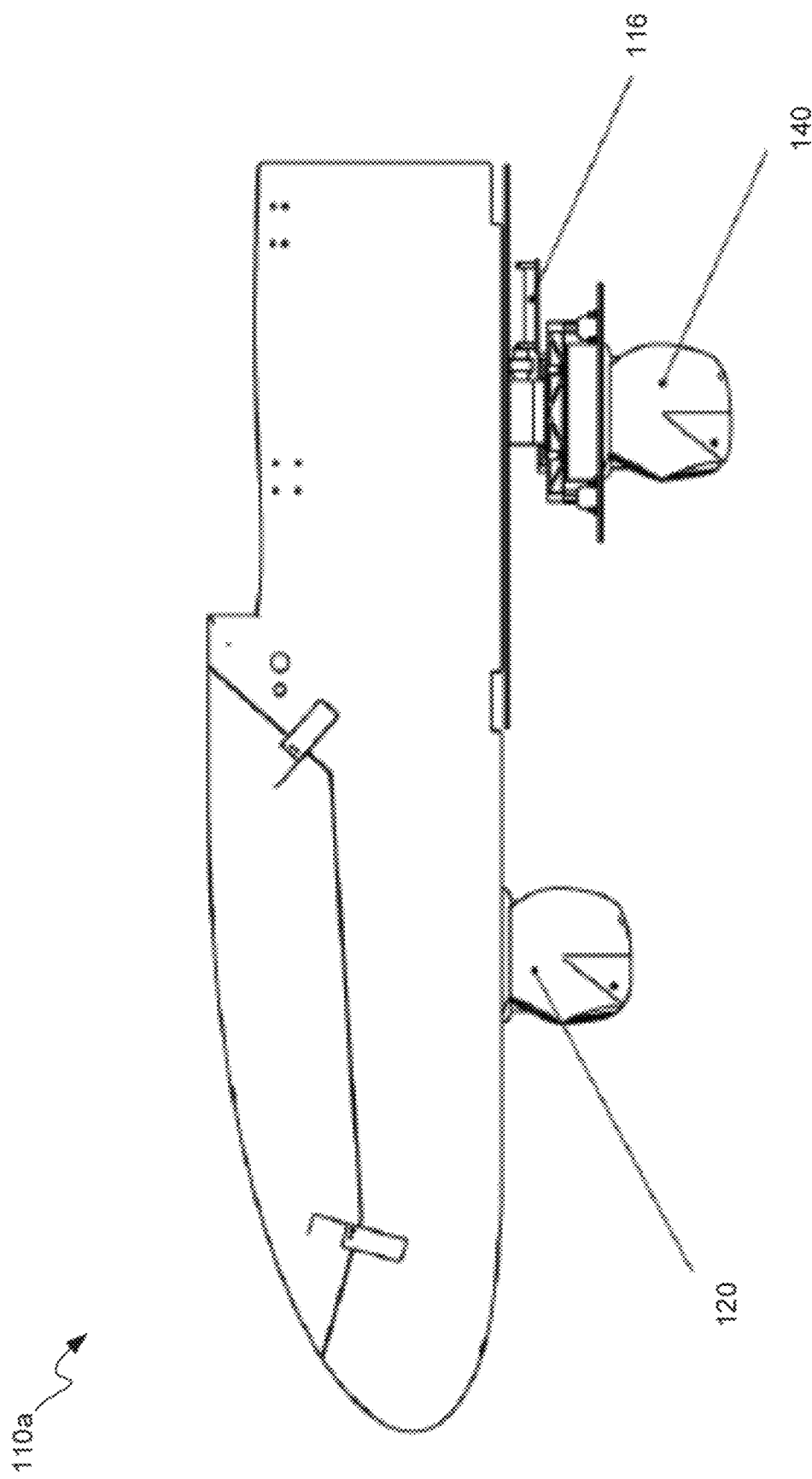
FIG. 4 illustrates in side elevation view an example fuselage for a dual use drone with a first ISR module and a second ISR module attached according to one embodiment of the present disclosure.

Moving next to FIG. 4, an example fuselage for a dual use drone with a first ISR module and a second ISR module attached is shown in side elevation view. Fuselage variation 110a can be similar to fuselage 110 above, and as such includes a camera 120 as part of a primary ISR unit. Rather than have a cargo unit as the second modular unit, however, fuselage variation 110a has a second camera 140 as part of a secondary ISR unit that operates in conjunction with the primary ISR unit. The same second standardized interface and power interface 116 can be used for this secondary ISR unit. Camera 140 can be the same type of camera as camera 120 on the primary ISR unit or may be different in some regards to optimize the abilities of both cameras 120 and 140 working together. For example, some arrangements may have one camera depicting a wide field of view while the other camera zooms in to show a particular target or various items of interest.

As another example, both cameras 120, 140 may rotate constantly about respective gimbals to provide an overall field of view that is very wide. The relative motions of cameras 120, 140 may be coordinated such that both cameras face in opposite directions at all times, or in other coordinated directions as may be desired. An enhanced operation of the combined functions of both cameras can involve video feeds from both cameras being stitched together by the onboard computing system in real time to provide a constant very wide field of view in all directions. Feeds from both cameras can be used to create a combined frame capture by stitching frames from both cameras together to form a single wide or enlarged image. This frame stitching can be repeated rapidly for each pair of frames to result in a combined video output that is greater than any output possible by either camera individually.

Figure 5:
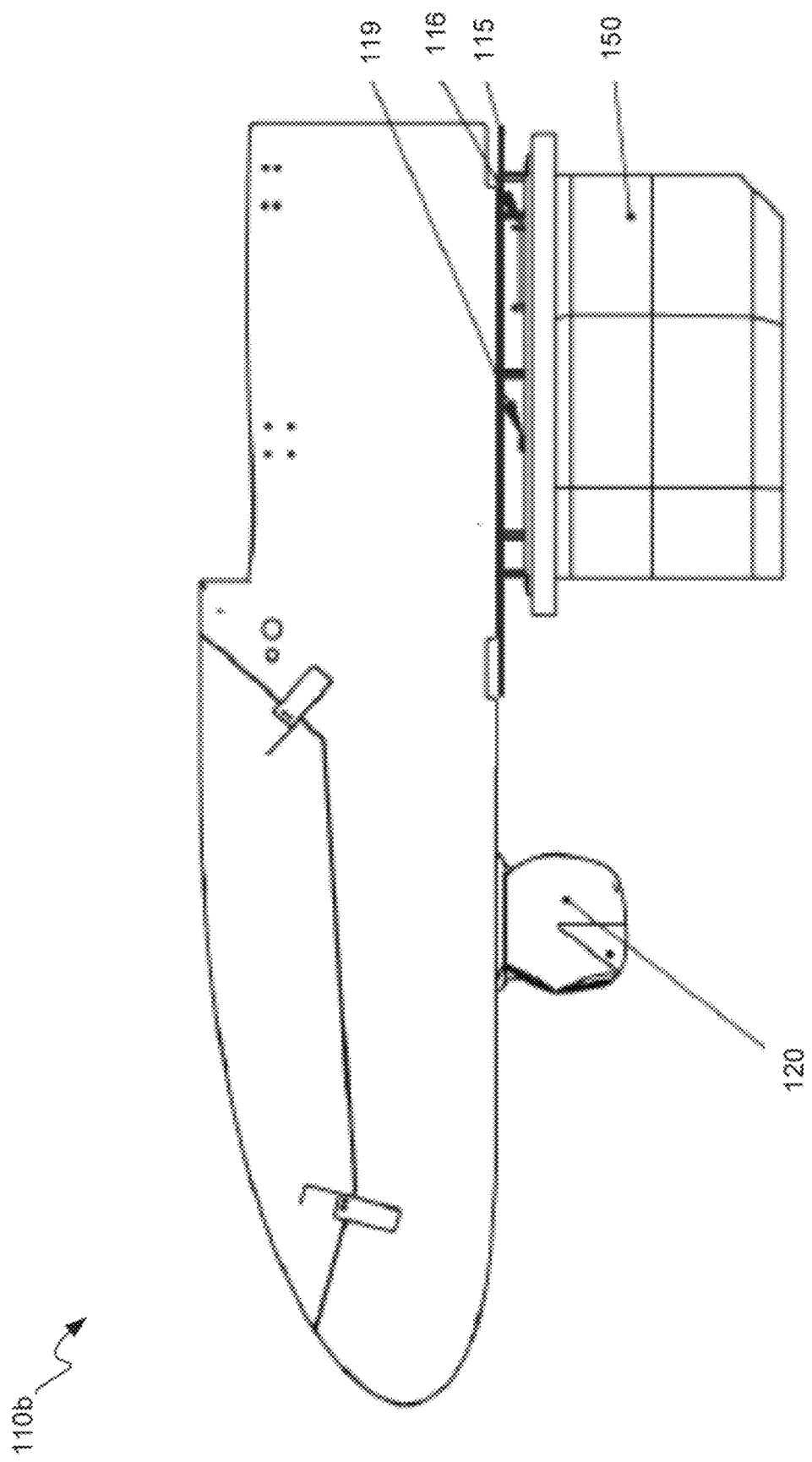
FIG. 5 illustrates in side elevation view an example fuselage for a dual use drone with an ISR module and a cargo fuel pod module attached according to one embodiment of the present disclosure.

FIG. 5 illustrates in side elevation view an example fuselage for a dual use drone with an ISR module and a cargo fuel pod module attached. Fuselage variation 110b can be similar to fuselage 110 and fuselage variation 110a above, and as such again includes a camera 120 as part of a primary ISR unit. Rather than have a cargo unit or additional ISR unit as the second modular unit, however, fuselage variation 110b can have a specialized cargo fuel pod 150. This cargo fuel pod 150 can have a bladder or other internal component that is adapted to contain and electrically insulate fuel or any other flammable liquid. Again, the same second standardized interface 115 and power interface 116 can be used for this modular cargo fuel unit. In addition, a fuel interface 119 can couple the cargo fuel unit to an active fuel line in the fuselage, such that fuel in the cargo fuel pod 150 can be used by the drone during flight if such use becomes necessary. As such, fuel in the cargo fuel pod 150 can be accessed to provide additional fuel that can extend the flight range of the drone. Of course, the cargo fuel pod 150 can also be delivered to a target in the field to provide fuel to the target. In instances where the drone used some of this fuel, then the payload drop becomes the remainder of the fuel in cargo fuel pod 150. The cargo unit may also be configured to hold a cargo of various items. While in flight, the cargo unit may be released from the interface to which it is connected under the fuselage of the drone. The cargo unit may have a parachute that is deployed shortly after the cargo unit is released from the drone. The drone may utilize an attached module ISR unit having a video camera to monitor and record the release of the cargo. The processor of the drone, may track the trajectory of the released cargo until the cargo lands onto the ground. The drone may receive a communication from the cargo unit, where the communication include a geo-spatial location of where the cargo unit landed (for example, the cargo unit may have on-board GPS or other location determination systems). In another embodiment, the drone may compute the tracked trajectory of the cargo, and compute an estimated geo-spatial location of where the cargo unit landed.

Figure 6:
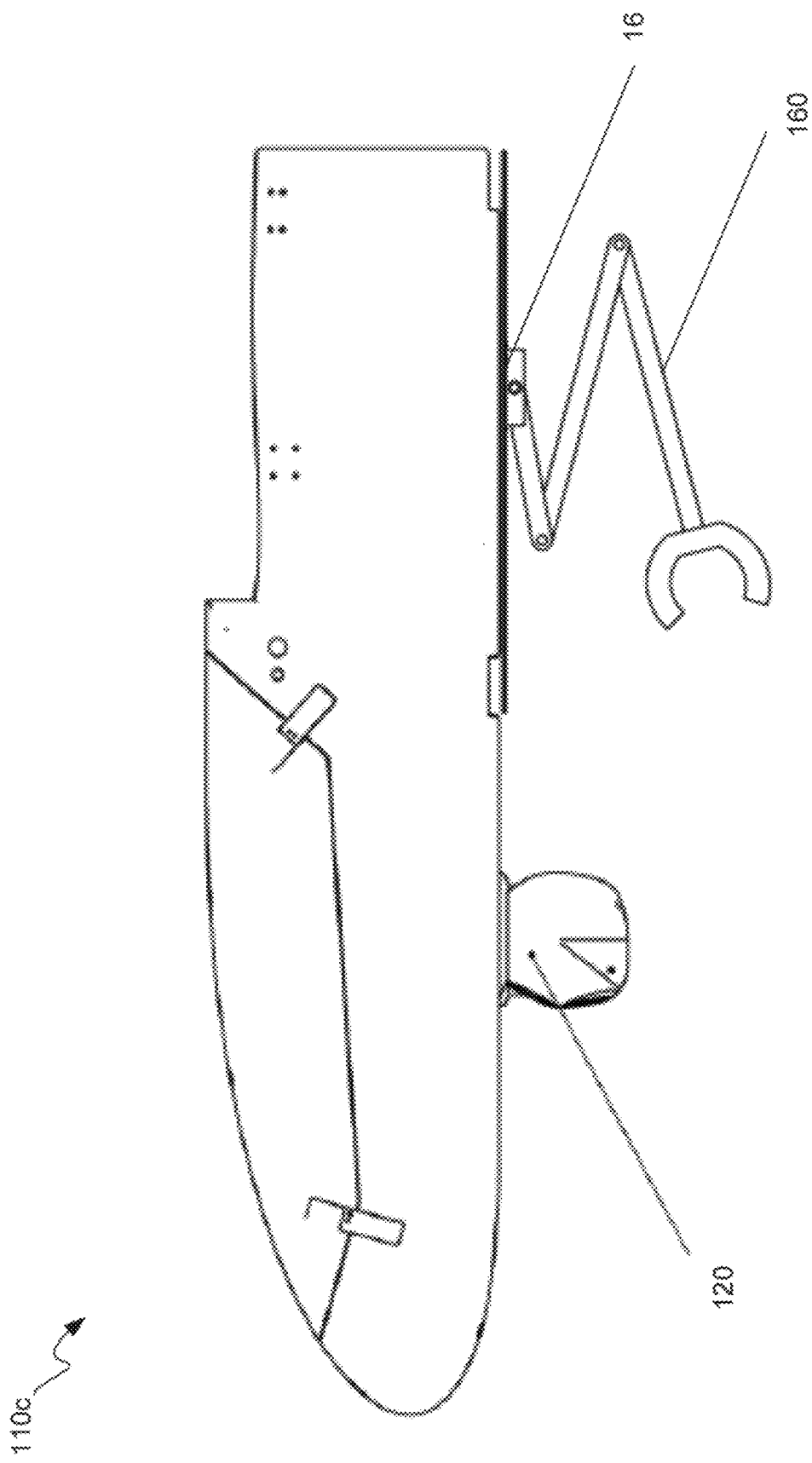
FIG. 6 illustrates in side elevation view an example fuselage for a dual use drone with an ISR module and a robotic arm module attached according to one embodiment of the present disclosure.

Continuing with FIG. 6, an example fuselage for a dual use drone with an ISR module and a robotic arm module attached is depicted in a side elevation view. Fuselage variation 110c can be similar to the foregoing fuselage variations, with this variation specifically including a video camera 120 for a primary ISR unit and a robotic arm 160 for a robotic arm assembly unit as the secondary modular unit. Again, the same power interface 116 can be used to provide power to the robotic arm assembly unit Robotic arm 160 can be configured to grab and control one or more foreign items during operation of the drone, either in flight or after landing. As in the foregoing embodiments, the robotic arm assembly unit can operate interactively with the other modular unit. For example, video camera 120 can provide a video feed that identifies a target or various objects for the robotic arm 160 to grasp, carry, or manipulate. The modular robotic arm assembly unit can use data from the video feed to assist in such grasping, carrying, or manipulating operations. This can be particularly useful where a target object is a complex item or is in motion, for example.

Figure 7:
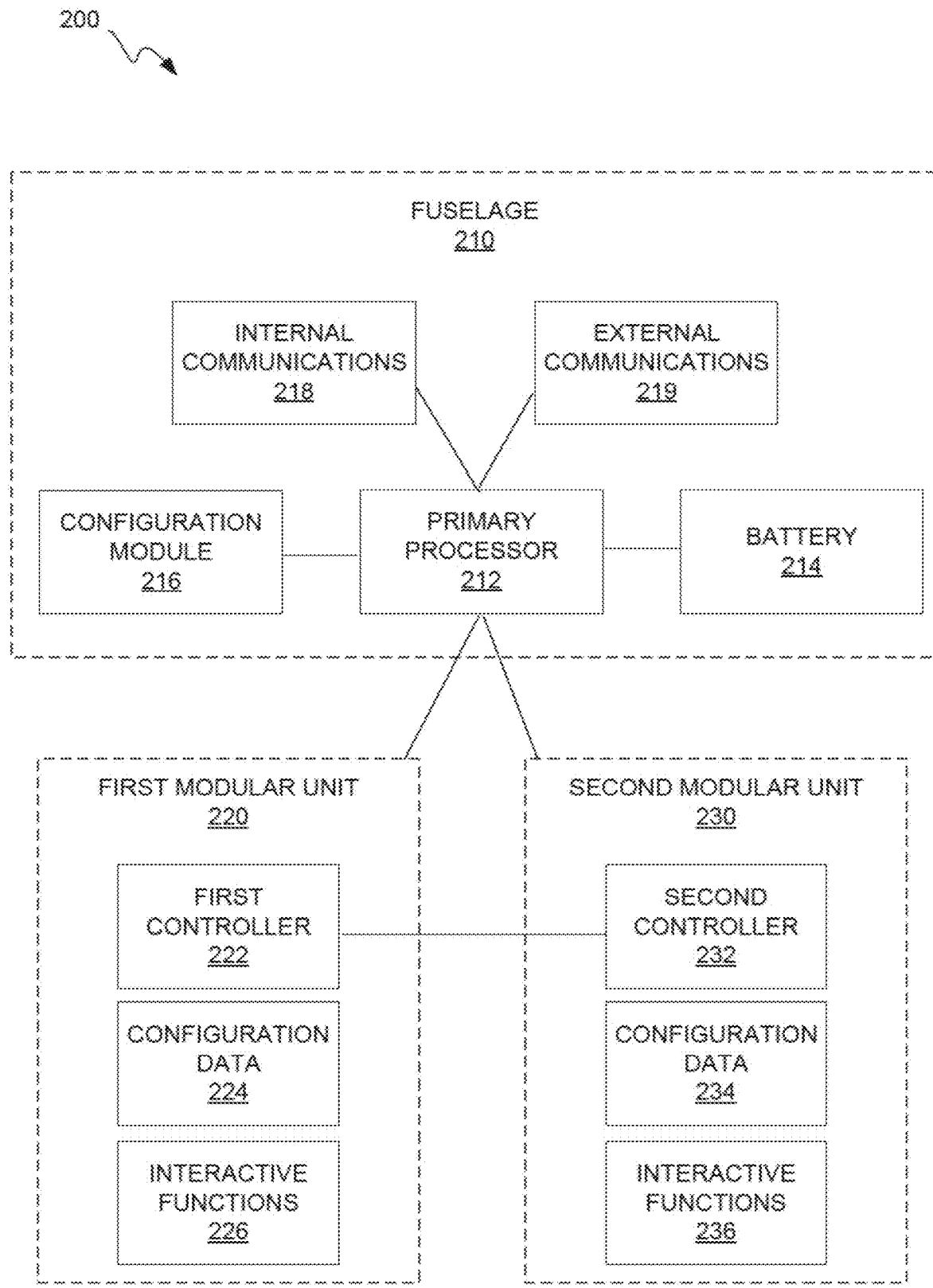
FIG. 7 illustrates a block diagram of an example computing architecture for a dual use drone according to one embodiment of the present disclosure.

Transitioning now to FIG. 7, a block diagram of an example computing architecture for a dual use drone is provided. Computing architecture 200 can include a variety of items, some or all of which are included at the fuselage 210, first modular unit 220 and second modular unit 230 of a drone. A primary processor 212 can be an onboard computer powered by a battery 214 or other power source. A configuration module 216 can be part of or operate with the primary processor 212 to configure the onboard computing system based upon the specific modular units that are coupled to the drone. An internal communications module 218 can coordinate communications within the drone, while an external communication module 219 can facilitate communications between the drone and one or more outside devices or systems, such as a remote database or monitor.

A first modular unit 220 can be removably coupled to the fuselage, and this unit can be an ISR unit or other suitable modular unit configured to perform a first substantial function for the drone. First modular unit 220 can have a localized first controller 222 that can communicate with the primary processor 212 located at the fuselage. Configuration data 224 can be data specific to the first modular unit and stored on a localized module or chip, while an interactive functions module 226 can provide specifics regarding activities that the first modular unit 220 may perform in coordinated fashion with the second modular unit 230.

Second modular unit 230 can also be removably coupled to the fuselage, and this unit can be a cargo unit or other secondary unit configured to perform a second substantial function for the drone. Second modular unit 230 can similarly have a second localized controller that can communicate with the primary processor 212, configuration data 234 specific to the second modular unit, and an interactive functions module 236 that can provide specifics regarding activities that the second modular unit 230 may perform in coordinated fashion with the first modular unit 220. In various arrangements, both the first modular unit 220 and second modular unit 230 can be autonomous and independent from each other, such that each can retain full functionality without input or interference from the other. For one or both modular units, input from the other modular unit can be used in some instances to provide an enhanced operation for the overall drone.

Although computing architecture 200 is depicted with various units in direct communication with primary processor 212, other or additional coupling arrangements are also possible. For example, some or all other units may also be in direct communication with each other. In some arrangements, it is specifically contemplated that the standardized interfaces for both of the first and second modular units can be coupled to a common bus. This can allow direct communications between the first and second modular units in addition to various communications with the primary processor 212 as it directs overall activities on the drone. Accordingly, a conceptual direct communication line is shown in FIG. 7 between first controller 222 of first modular unit 220 and second controller 232 of second modular unit 230. Such direct communications between the first modular unit 220 and second modular unit can actually take place along the common bus without a need for intervention by primary processor 212.

Example Methods

Several methods or processes can apply for the variously configured dual use drones described in detail above. In particular, various methods of configuring a dual use drone and various methods of operating a configured dual use drone during flight can be used. A flowchart 300 of an example method of configuring a dual use drone is provided in FIG. 8. After a start step 302, a first modular unit can be coupled to the fuselage at a process step 304. As detailed above, this can be a primary ISR unit having a video camera, for example.

At a following process step 306, a second modular unit can be coupled to the fuselage. This can be a cargo unit, for example. Alternatively, this can be a secondary ISR unit, a cargo fuel tank unit, a robotic arm unit, or some other secondary modular unit. A primary processor can be configured at the next process step 308. This can include configuring an onboard computer or primary processor at the fuselage to be operable with respect to both of the first and second modular units. Configuration can include reading configuration data and other historical data from both modular units, as well as adjusting processes within the primary processor to adapt to the specific functions of each modular unit.

At process step 310, interactivity between the first and second modular units can be confirmed. This can include ensuring that the functions of one or both of the modular units can be accomplished using input or other data obtained from the other modular unit during operation. For example, confirmation can be made that input from an ISR unit is usable while performing the functions of a cargo unit or other secondary unit. The method then ends at end step 312.

Figure 9:
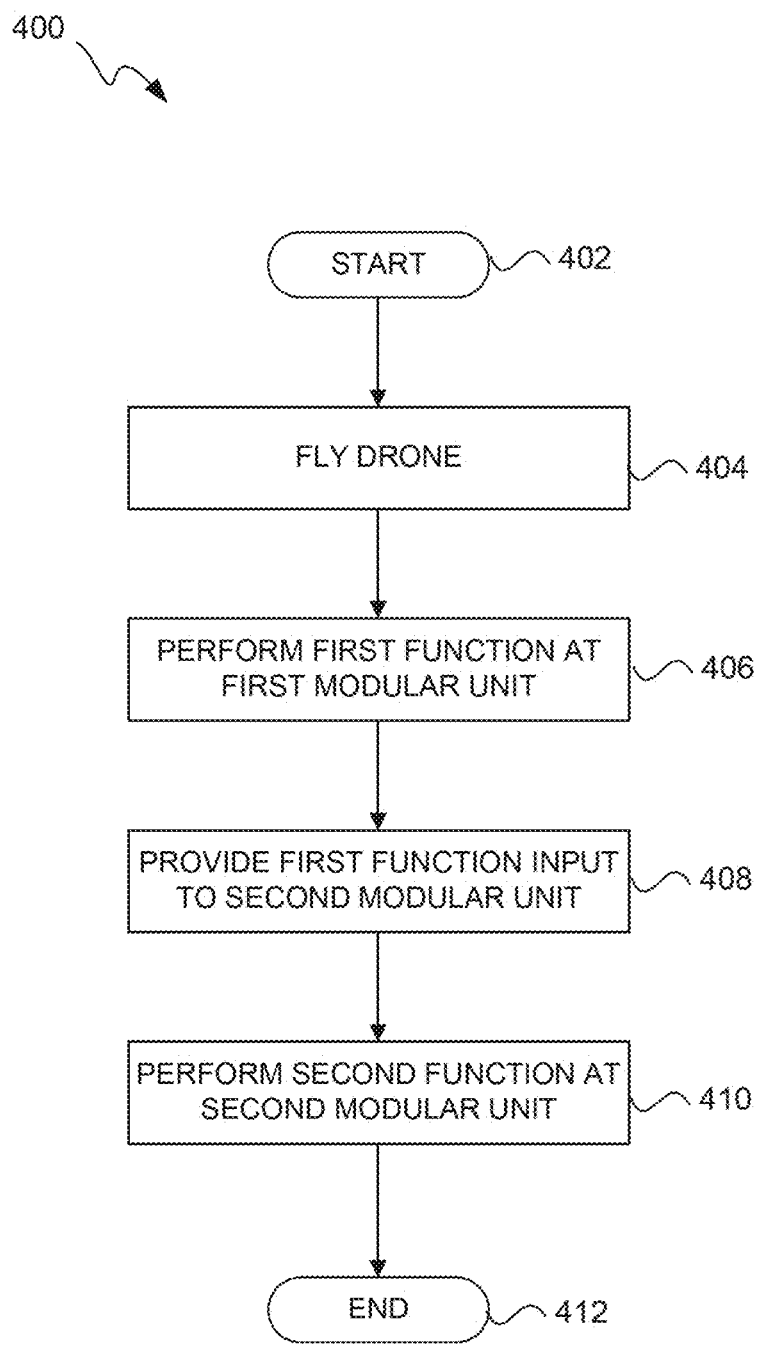
FIG. 9 illustrates a flowchart of an example method of coordinating disparate functions during flight in a dual use drone according to one embodiment of the present disclosure.

Lastly, FIG. 9 illustrates a flowchart 400 of an example method of coordinating disparate functions during flight in a dual use drone. After a start step 402, the drone can be put into flight at a process step 404. At a following process step 406, a first function can be performed at a first modular unit on the drone while the drone is in flight. For example, this can involve the capture of video by a primary ISR unit on the drone. At a subsequent process step 408, an input from the first function can be provided to the second modular unit. For example, such an input can be video footage or a target determination made by a primary ISR unit.

At the next process step 410, a second function can be performed at the second modular unit. This second function can be performed using the input provided at previous process step 408. For example, delivery of a cargo pod can be the second function. This cargo pod delivery can be performed using a delivery target that was identified as the first function by a primary ISR unit, which this delivery target identification being the first function input that was delivered to the cargo unit as the second modular unit. Of course, other second functions and second modular units are also possible, and other forms of input from a primary ISR unit or other first modular unit are also possible. The method then ends at end step 412.

Figure 8:
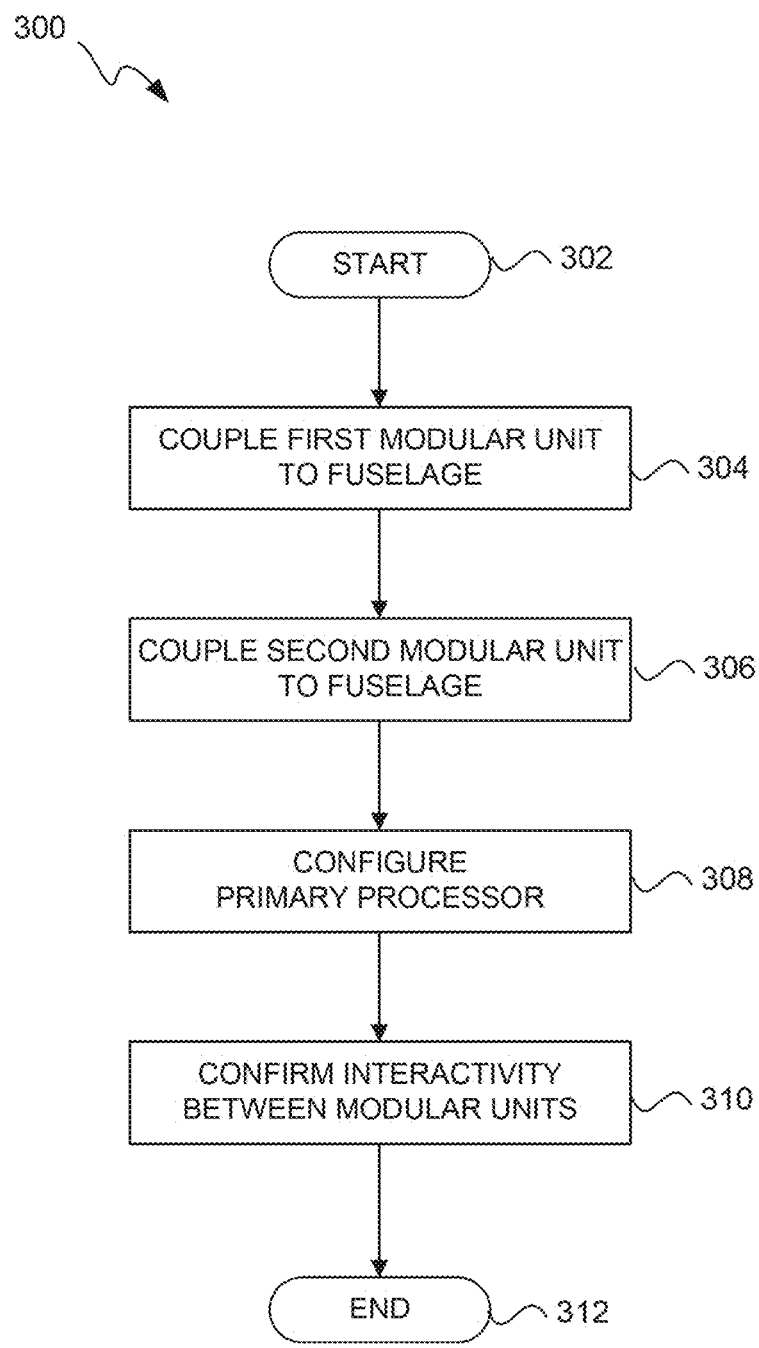
FIG. 8 illustrates a flowchart of an example method of configuring a dual use drone according to one embodiment of the present disclosure.

For both of the methods illustrated in FIGS. 8 and 9, it will be appreciated that not all method steps are needed, and that other method steps may also be included. Furthermore, the order of method steps may be rearranged in some instances. For example, step 306 may be performed before step 304 in some arrangements. Alternative steps may also be substituted in place of any of the disclosed steps.

In other embodiments, the UAV may identify the type of unit attached to ISR or payload attached to the first or second standard interface 114, 115. The UAV processor may identify the type of attachment, and perform operations based on the type of attachment. For example, the UAV processor may detect that a ISR with a camera is attached to the first standard interface 114 and that a payload is attached to the second standard interface 115. During an aerial operation, the UAV may deploy the payload, and then using the ISR with the camera, track and obtain video footage of the payload as its being deployed. Based on obtained imagery of the path of the deployed payload (e.g., with a parachute), the processor may determine the approximate ground location of where the payload would land, and provide a transmission of the landing location with geospatial data. Additionally, the UAV may continue to fly or hover about the landing area, and the processor may determine that the payload has landed. Based on the determined landing of the payload, the UAV may then continue flying back to a return location or continue with its mission.

In one embodiment, two ISR units with cameras may be attached to the first and second standard interfaces 114, 115. The UAV process may control the cameras such that the first forward attached camera is synchronized with the imagery taken by the second rear attached camera (or vice versa). The forward camera for example, may be zoomed into to a particular location, while the rearward camera may be zoom out and obtains a broader field of view the imagery.

In one embodiment, the ISR unit has electronic connectors about the interface for providing electronic communication between the ISR unit and the UAV processor. For example, the ISR unit may communicate information via the interface 114, 115 to the UAV, and the UAV will operate in accordance with the type of ISR unit attached. An ISR unit, for example, may communicate the weight of the ISR unit to the UAV processor. The UAV processor then may adjust the flight characteristics of the UAV, such adjust power and rotation speed of one or more rotors to adjust to the weight attached to a forward and/or rear interfaces. This may be important especially where the weight has a significant impact on the weight/balance of the UAV.

In one embodiment, the UAV processor may determine an amount available flight time to reach a particular way point or destination. In some circumstances, the UAV may determine that the UAV does not have enough energy or fuel tor reach its destination. The UAV processor may eject an ISR unit to achieve a longer flight time, especially where the ISR Unit includes a heavy payload.

In some embodiment, the ISR unit may communicate the type of attachment to the UAV processor. For example, the front interface receive an attachment an ISR unit with a standard camera, a infrared camera, a LiDar unit, etc. The UAV processor may then may automatically perform flight operations due to the type of ISR unit attached. In some circumstances, to obtain a particular quality or resolution of data from ISR unit sensor or camera attached, the UAV may automatically limit its maximum speed or altitude such that the sensor or camera may obtain a particular quality of sensor information. For example, the camera speed may be taken into consideration by the UAV processor so the UAV may obtain non-blurry imagery for moving forward. The UAV processor may also use a database or other stored information to lookup the maximum forward flight speed of the UAV with regard to a particular type of ISR unit that is attached. In some instances, the UAV may have two ISR units attached, and the UAV would use the slowest maximum forward flight speed of the two ISR units.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A dual use unmanned aerial vehicle (UAV), the UAV comprising:
   a fuselage, the fuselage having a forward positioned interface integrally formed with a bottom area of the fuselage, the forward positioned interface configured to receive at least a first modular intelligence, surveillance, and reconnaissance (ISR) unit, and a rearward positioned interface integrally formed with the bottom area of the fuselage, the rearward positioned interface configured to receive at least a first modular cargo unit and wherein the rearward positioned interface is configured to interchangeably receive a second modular cargo unit in place of the first modular cargo unit;
   an electrical power source located at the fuselage;
   a primary processor located at the fuselage and powered by the electrical power source;
   the first modular ISR unit comprising a first video camera, the first modular ISR unit removably coupled to the forward positioned interface, wherein the first modular ISR unit is capable of communication with the primary processor;
   a second modular ISR unit comprising a second video camera, wherein the first video camera is movably mounted on a first gimbal and the second video camera is movably mounted on a second gimbal and wherein the first video camera and the second video camera have relative, coordinated motions such that the first video camera faces in an opposite direction from the second video camera at all times; and
   the first modular cargo unit, comprising a cargo pod, the first modular cargo unit configured to be removably coupled to the rearward positioned interface, wherein the first modular cargo unit is capable of communication with the primary processor, and wherein the primary processor is configured to:
      identify whether the first modular cargo unit or the second modular cargo unit is coupled to the rearward positioned interface;
      identify that the second modular cargo unit is a larger cargo pod than the first modular cargo unit and further identify a cargo pod type of the second modular cargo unit;
      cause the first video camera of the first modular ISR unit to behave differently depending on whether the first modular cargo unit or the second modular cargo unit is coupled to the rearward positioned interface, and wherein such difference in behavior causes tilting and rotation of the first video camera and automatic adjustment of an applicable field of view for the first video camera based on a physical dimension of the second modular cargo unit.

2. The dual use UAV of claim 1, wherein the primary processor is configured to cause the UAV to coordinate the interaction between the first modular ISR unit and the first modular cargo unit.

3. The dual use UAV of claim 1, wherein the primary processor is configured to cause the first modular ISR unit to utilize the first video camera to identify a delivery location for delivery of the cargo pod of the first modular cargo unit.

4. The dual use UAV of claim 3, wherein the primary processor is configured to direct the flight of the dual use UAV to arrive at the delivery location.

5. The dual use UAV of claim 3, wherein the primary processor is configured to cause the first modular cargo unit to release its cargo pod when the dual use drone is at the delivery location.

* * * * *